US009713956B2

(12) United States Patent
Bark et al.

(10) Patent No.: US 9,713,956 B2
(45) Date of Patent: Jul. 25, 2017

(54) VEHICLE-TO-VEHICLE COMMUNICATION SYSTEM PROVIDING A SPATIOTEMPORAL LOOK AHEAD AND METHOD THEREOF

(71) Applicant: Honda Motor Co., Ltd., Tokyo (JP)

(72) Inventors: Karlin Bark, Menlo Park, CA (US); Victor Ng-Thow-Hing, Sunnyvale, CA (US); Cuong Tran, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 14/639,855

(22) Filed: Mar. 5, 2015

(65) Prior Publication Data

US 2016/0257199 A1 Sep. 8, 2016

(51) Int. Cl.
*G06F 7/00* (2006.01)
*B60K 35/00* (2006.01)

(52) U.S. Cl.
CPC ...... *B60K 35/00* (2013.01); *B60K 2350/1084* (2013.01); *B60K 2350/2017* (2013.01); *B60K 2350/2052* (2013.01); *B60K 2350/965* (2013.01)

(58) Field of Classification Search
CPC ............ B60K 35/00; B60K 2350/2017; B60K 2350/2052; B60K 2350/2056; B60K 2350/965
See application file for complete search history.

(56) References Cited

U.S. PATENT DOCUMENTS

| 5,519,536 | A | 5/1996 | Hoehn |
| 6,121,896 | A | 9/2000 | Rahman |
| 6,879,241 | B2 | 4/2005 | Sakamoto et al. |
| 7,209,050 | B2 | 4/2007 | Corcoran |
| 7,425,903 | B2 * | 9/2008 | Boss ............... G08G 1/162 340/435 |

(Continued)

FOREIGN PATENT DOCUMENTS

| DE | 102006016807 A1 | 10/2007 |
| EP | 1561631 A2 | 8/2005 |

(Continued)

OTHER PUBLICATIONS

Samsung "Safety Truck" http://newatlas.com/samsung-safety-truck-cameras-screens/38122/.

(Continued)

*Primary Examiner* — Ian Jen
(74) *Attorney, Agent, or Firm* — Honda Patents & Technologies North America, LLC; Aaron C Fong

(57) ABSTRACT

A vehicle-to-vehicle communication system providing a spatiotemporal look ahead and method thereof is provided. A trailing vehicle having a look ahead capability can communicate with a preceding vehicle. The preceding vehicle can measure a distance to a leading vehicle and provide that information through vehicle-to-vehicle communications to the trailing vehicle. The trailing vehicle can then display an augmented reality indicator above the vehicle through its head-up display indicating how far the leading vehicle is in front of the preceding vehicle. An icon representing the leading vehicle can be displayed within the augmented reality indicator representing the leading vehicle. Braking actions by the leading vehicle can be communicated to the trailing vehicle through the augmented reality indicator.

20 Claims, 6 Drawing Sheets

(56) References Cited

U.S. PATENT DOCUMENTS

| | | | |
|---|---|---|---|
| 7,486,199 B2 | 2/2009 | Tengler et al. | |
| 7,519,471 B2 * | 4/2009 | Shibata | G01C 21/365 340/425.5 |
| 7,554,435 B2 * | 6/2009 | Tengler | B60Q 1/44 340/425.5 |
| 7,642,931 B2 * | 1/2010 | Sato | B60W 50/14 340/436 |
| 7,782,227 B2 | 8/2010 | Boss et al. | |
| 7,991,551 B2 | 8/2011 | Samuel et al. | |
| 8,098,171 B1 * | 1/2012 | Szczerba | B60Q 9/008 340/438 |
| 8,269,652 B2 | 9/2012 | Seder et al. | |
| 8,301,336 B2 * | 10/2012 | Baumann | B60R 21/0134 701/301 |
| 8,350,686 B2 * | 1/2013 | Inoue | G01C 21/36 340/435 |
| 8,514,099 B2 * | 8/2013 | Seder | B60W 30/095 340/438 |
| 8,686,872 B2 * | 4/2014 | Szczerba | G02B 27/01 340/435 |
| 8,704,653 B2 | 4/2014 | Seder et al. | |
| 8,886,386 B2 | 11/2014 | Merk | |
| 8,947,219 B2 | 2/2015 | Popovic | |
| 8,972,159 B2 | 3/2015 | Ferreira et al. | |
| 9,140,782 B2 | 9/2015 | Alberth et al. | |
| 9,165,460 B2 | 10/2015 | Aziz | |
| 2006/0164219 A1 * | 7/2006 | Knoll | B60Q 9/008 340/435 |
| 2007/0030212 A1 * | 2/2007 | Shibata | G08G 1/162 345/9 |
| 2010/0253539 A1 * | 10/2010 | Seder | G01S 13/723 340/903 |
| 2010/0253540 A1 * | 10/2010 | Seder | B60R 1/00 340/905 |
| 2012/0268262 A1 * | 10/2012 | Popovic | B60Q 9/008 340/438 |
| 2013/0181823 A1 * | 7/2013 | Stahlin | B60K 35/00 340/436 |
| 2014/0012492 A1 | 1/2014 | Bowers et al. | |
| 2014/0139676 A1 | 5/2014 | Wierich | |
| 2014/0341434 A1 * | 11/2014 | Lin | G08G 1/166 382/104 |

FOREIGN PATENT DOCUMENTS

| | | |
|---|---|---|
| EP | 1647448 A2 | 4/2006 |
| FR | 2948220 A1 | 1/2011 |
| FR | 3029156 A1 | 6/2016 |
| GB | 2519370 A | 4/2015 |
| JP | 2008-037167 A1 | 2/2008 |
| JP | 2010-026708 A1 | 2/2010 |
| WO | 2013/113500 A1 | 8/2013 |

OTHER PUBLICATIONS

Samsung Presents First "Samsung Safety Truck" Prototype https://news.samsung.com/global/samsung-presents-first-samsung-safety-truck-prototype.

"See-Through System Turns View-Blocking Vehicles Transparent" http://newatlas.com-through-system-29446/.

"Augmented reality system makes cars see-through" https://www.newscientist.com/article/mg22029394-600-augmented-reality-system-makes-cars-see-through/#.UmBezYUzJXZ.

* cited by examiner

VEHICLE-TO-VEHICLE COMMUNICATION SYSTEM PROVIDING A SPATIOTEMPORAL LOOK AHEAD AND METHOD THEREOF

BACKGROUND

Automobile manufacturers have recently begun to include head-up displays and vehicle-to-vehicle communications in their car designs in an attempt to provide drivers with information. Head-up displays can be designed to focus a driver's attention in front of them instead of other areas within the vehicle and vehicle-to-vehicle communications can allow vehicles to converse with one another. None of these systems, either alone or in combination, have solved situational awareness issues for the driver.

In one example, a trailing vehicle's view of vehicles in front of them is often obscured. While information provided on a head-up display has been useful, content on the display has been limited. For example, content has been limited to two-dimensional images referencing vehicle and navigational information. Current systems have also failed to take advantage of vehicle-to-vehicle communications to overcome situational awareness issues. These communications have been limited to alerting others of potential hazards such as potholes or police activities. As a result, a vehicle-to-vehicle communication system providing a spatiotemporal look ahead and method thereof is needed.

BRIEF DESCRIPTION

According to one aspect of the present disclosure, a method for representing an area in front of a vehicle on a trailing vehicle is provided. The method includes connecting with the vehicle through vehicle-to-vehicle communications and displaying an augmented reality indicator representing the area in front of the vehicle. In addition, the method includes displaying spatiotemporal information within the augmented reality indicator of a leading vehicle identified by the vehicle and communicated to the trailing vehicle through the vehicle-to-vehicle communications.

According to another aspect of the present disclosure, a look ahead system is provided. The system includes a head-up display, at least one processor, and a memory operatively coupled to the processor, the memory storing program instructions that when executed by the processor, causes the processor to perform processes. The processes include identifying a vehicle, receiving information regarding a leading vehicle from the vehicle and displaying an augmented reality indicator on the head-up display above the vehicle showing an area in front of the vehicle and an icon for the leading vehicle.

According to yet another aspect of the present disclosure, a vehicle is provided. The vehicle includes a wireless communication module receiving information regarding an area in front of a preceding vehicle. In addition, the vehicle includes a head-up display depicting an augmented reality indicator above the preceding vehicle and showing the information regarding the area in front of the preceding vehicle.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

Figure 1:
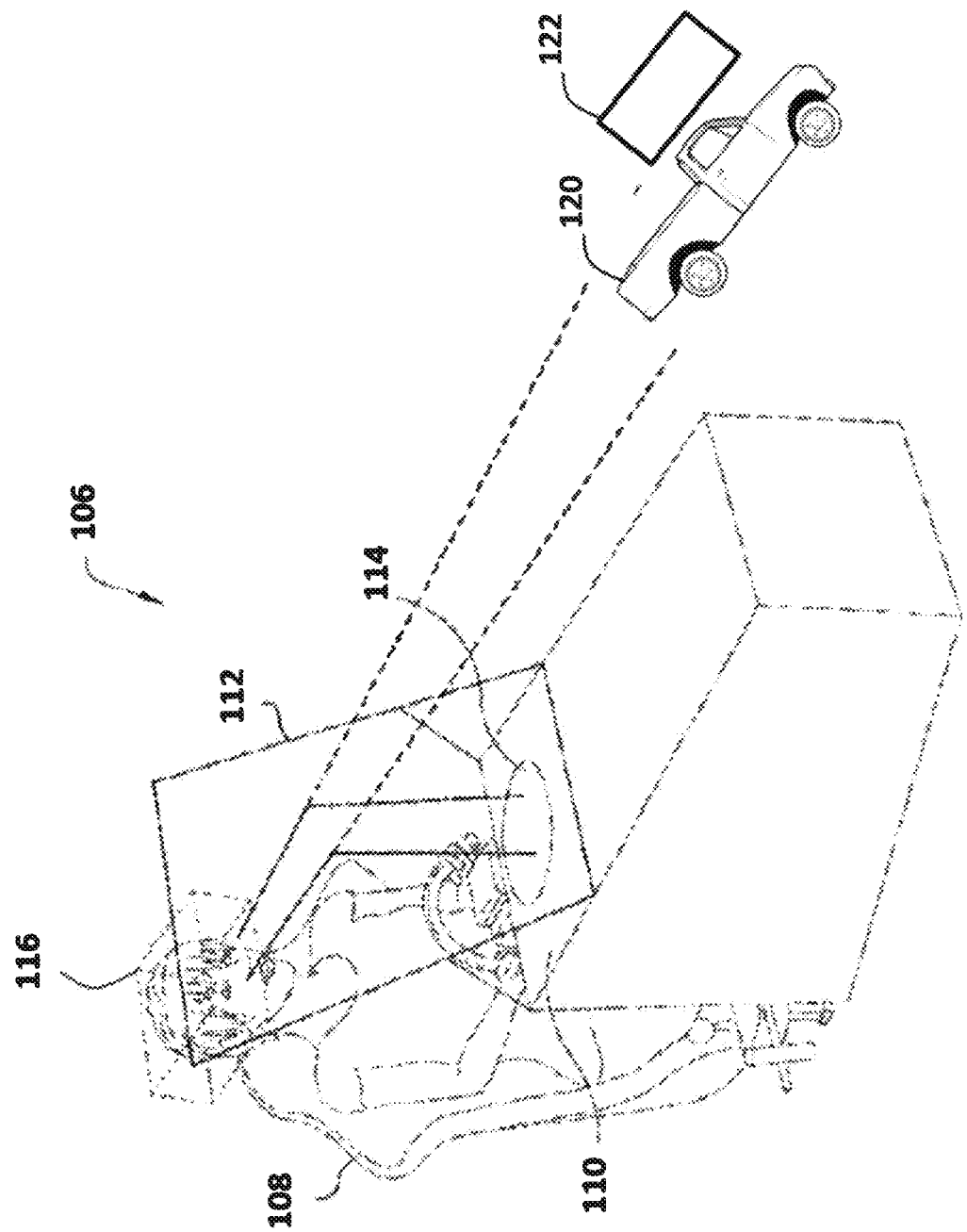
FIG. 1 illustrates a block diagram depicting an exemplary head-up display for showing an augmented reality indicator for a spatiotemporal look ahead in accordance with one aspect of the present disclosure.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

A "processor," as used herein, includes, but is not limited to a device that can process signals and perform general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "memory," as used herein, can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device. Memory can be operatively coupled to the processor. The memory can store program instructions that can be executed by the processor.

A "disk," as used herein, can be a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

An "operable connection" or a connection by which entities are "operably connected," as used herein, is one in which signals, physical communications, and/or logical communications can be sent and/or received. An operable connection can include a wireless interface, a physical interface, a data interface, and/or an electrical interface.

Generally described, the systems and methods provided herein are directed to content provided on a vehicle head-up display. The content, according to one exemplary embodiment, can be an augmented reality indicator for a spatiotemporal look ahead on a head-up display. A trailing vehicle having the look ahead capabilities can communicate with a preceding vehicle. The preceding vehicle can measure a distance to a leading vehicle and provide that information through vehicle-to-vehicle communications to the trailing vehicle. The trailing vehicle can then display the augmented reality indicator above the preceding vehicle through its head-up display indicating how far the leading vehicle is in front of the preceding vehicle. An icon representing the leading vehicle can be displayed within the augmented reality indicator representing the leading vehicle. Braking actions by the leading vehicle can be communicated to the trailing vehicle through the preceding vehicle.

A number of advantages can be provided using the systems and methods described herein. Visual aids can be provided of obstructed vehicles on the trailing vehicle and in front of the preceding vehicle. Acknowledgment of leading vehicles obscured by preceding vehicles can be valuable to a driver. The augmented reality indicator, as provided through the head-up display, can remove unwanted clutter associated with other systems. Actual scenery or objects can be seen through the transparent, or semi-transparent, augmented reality indicator. Other advantages will become apparent from the description provided below.

Figure 2:
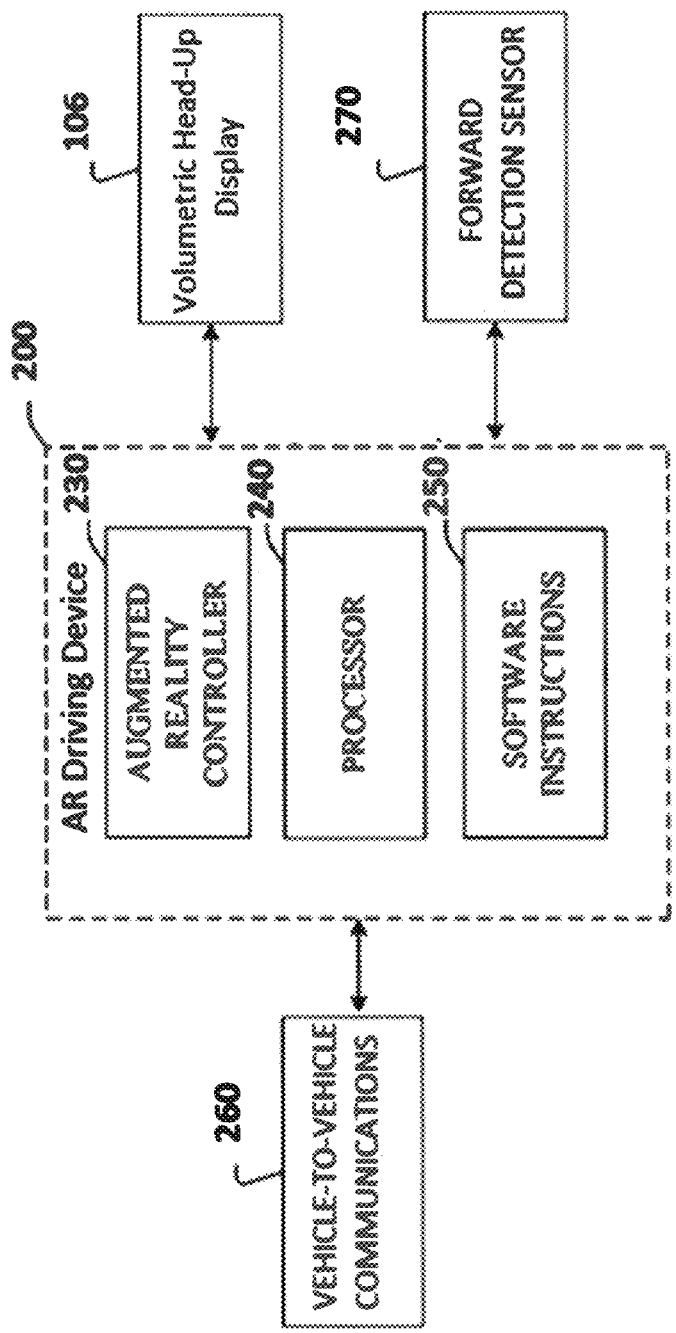
FIG. 2 illustrates a block diagram of an exemplary augmented reality driving device for providing the look ahead in accordance with one aspect of the present disclosure.
Figure 3:
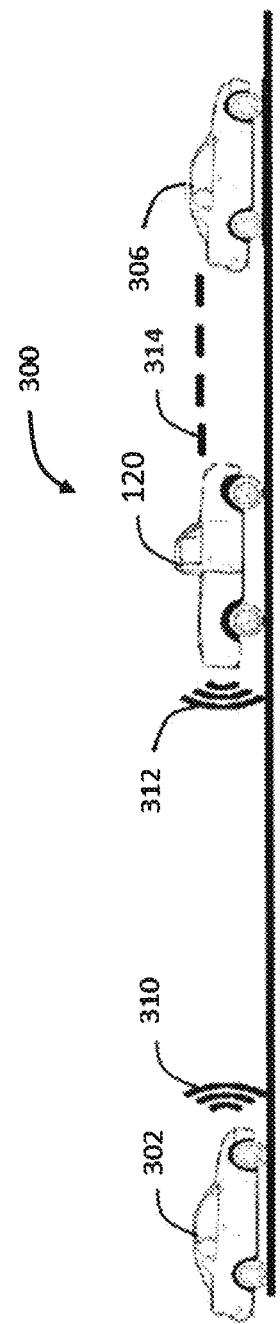
FIG. 3 illustrates an exemplary vehicle-to-vehicle communication to provide the look ahead for a trailing vehicle in accordance with one aspect of the present disclosure.
Figure 4:
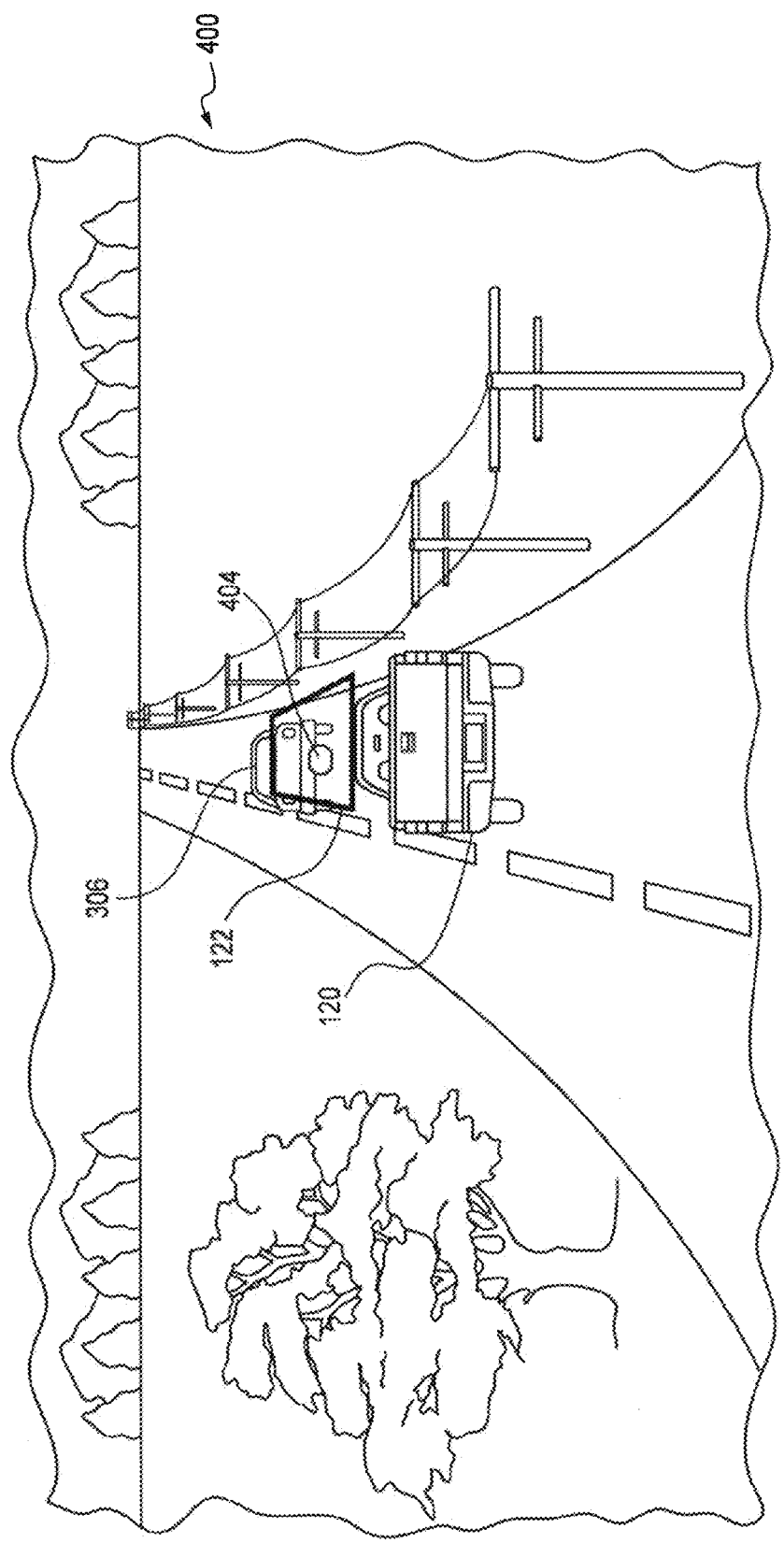
FIG. 4 illustrates an exemplary point of view showing the augmented reality indicator over a vehicle in accordance with one aspect of the present disclosure.
Figure 5:
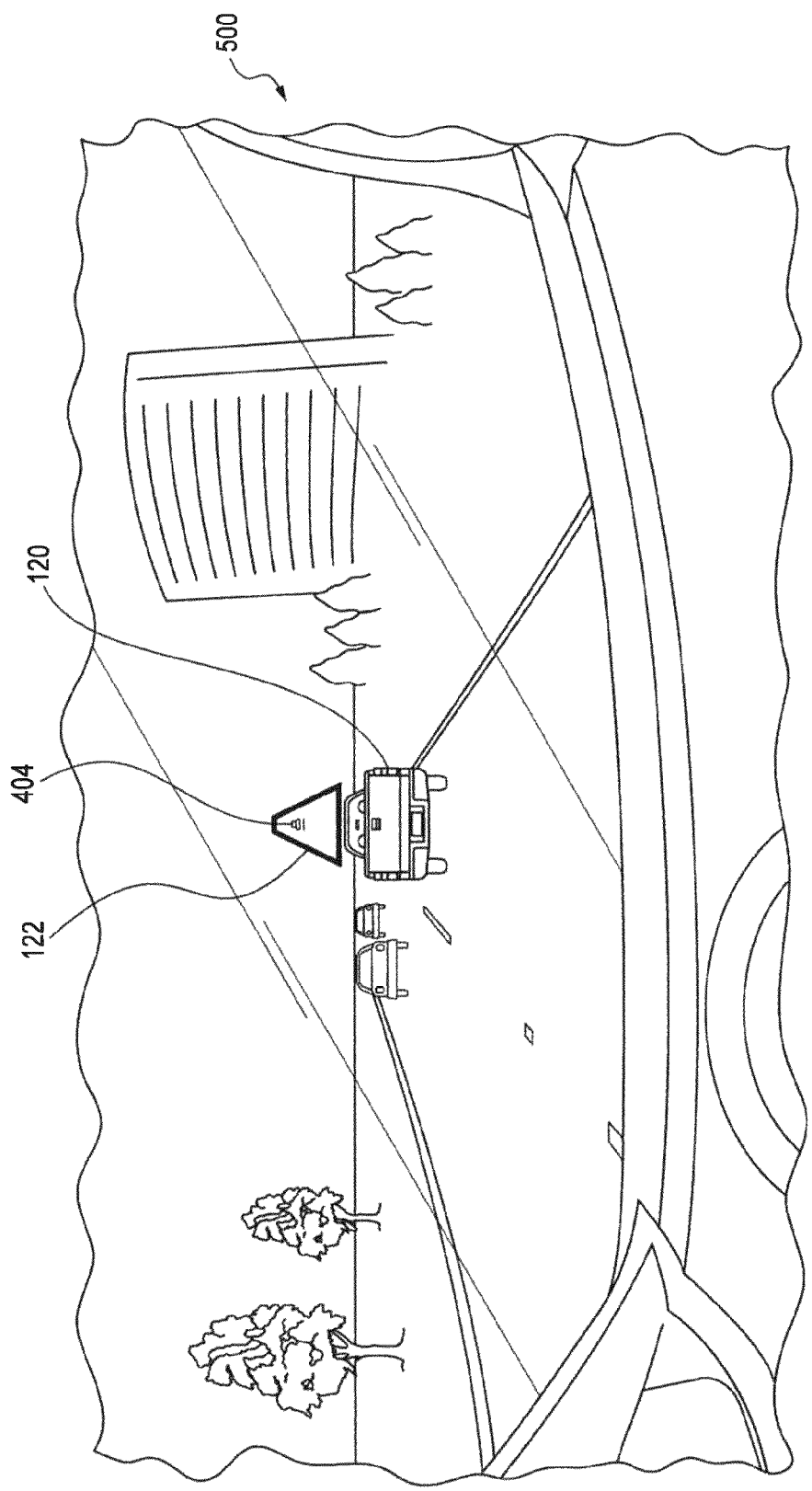
FIG. 5 illustrates the augmented reality indicator with an obstructed view of the leading vehicle in accordance with one aspect of the present disclosure.
Figure 6:
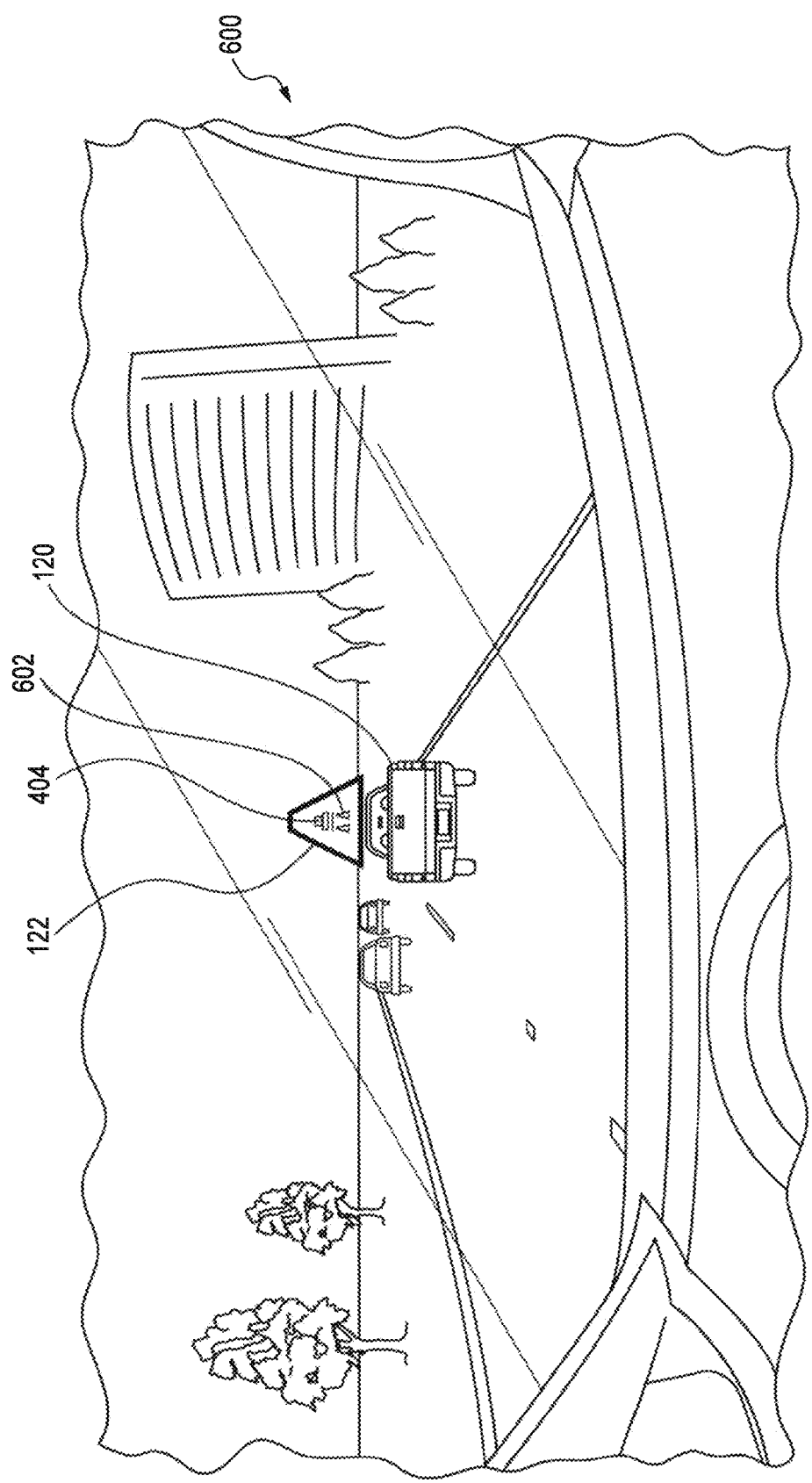
FIG. 6 illustrates the augmented reality indicator with the leading vehicle braking in accordance with one aspect of the present disclosure.

While the augmented reality indicator is shown as having a trapezoidal configuration, other types of indicia can be used and is not limited to those described herein. For example, circular or square indicators can be used instead. Advantageously, however, the trapezoidal shape represents an area in front of the preceding vehicle to a point where the leading vehicle cannot be seen. With reference to the FIGURES, FIGS. 1 and 2 depict an exemplary head-up display along with illustrative hardware for providing the augmented reality indicator. FIG. 3 shows a three vehicle configuration for the augmented reality indicator while FIG. 4 describes a point of view of the trailing vehicle. FIGS. 5 and 6 represent movements of the leading vehicle and corresponding icon displacements within the augmented reality indicator.

FIG. 1 illustrates a block diagram depicting an exemplary head-up display 106 for showing an augmented reality indicator 122 for a spatiotemporal look ahead in accordance with one aspect of the present disclosure. The spatiotemporal look ahead can be used with a volumetric head-up display 106. Alternatively, the indicator 122 can be depicted on an instrument cluster or other location within the vehicle. Typically, the indicator 122 can be shown above a preceding vehicle 120.

The vehicular volumetric head-up display 106 can be capable of rendering volumetric contact-analog augmented reality graphic elements (e.g., 3-dimensional or "3-D" graphic elements rendered into the same space as the real environment) with correctly reproduced depth cues. The configuration of the vehicle, with respect to the relative positioning of the driver seat 108, dashboard enclosure 110, and windshield 112, for example, can be conventional. The dashboard enclosure 110 can have a head-up display exit aperture 114 defined through an upper surface thereof. The head-up display 106 housed in the dashboard enclosure 110 can project graphic elements, such as contact-analog augmented reality graphic elements, through the head-up display exit aperture 114 to the windshield 112.

The eye box 116 can be sized to encompass different possible head positions of the driver regardless of a position and posture of the driver seat 108, or the head-up display 106 can be configured to detect the position and posture of the driver seat 108, and to adjust a position and size of the eye box 116 based thereon. Through the head-up display 106, the augmented reality indicator 122 for the look ahead can be shown. Multiple focal planes are generated by the volumetric head-up display such that the indicator 120 can be viewed as a three-dimensional image.

Referring to FIG. 2, a block diagram of an exemplary augmented reality driving device 200 for providing the look ahead in accordance with one aspect of the present disclosure is provided. The device 200 can be in communication with the volumetric head-up display 106 on the trailing vehicle. The device 200 can include an augmented reality controller 230 which has a processor 240 to execute software instructions 250 to perform operations, in part, of:

Detecting a vehicle 120 in front of the trailing vehicle through a forward detection sensor 270;

Opening communications with the preceding vehicle 120 through a wireless module;

Connecting with the vehicle through vehicle-to-vehicle communications 260;

Displaying an augmented reality indicator 122 representing the area in front of the vehicle 120; and Displaying spatiotemporal information within the augmented reality indicator 122 of a leading vehicle identified by the vehicle 120 and communicated to the trailing vehicle through the vehicle-to-vehicle communications 260.

The forward detection sensor 270 can include a camera. The camera can detect the vehicle 120 in front of the trailing vehicle through captured images. Other types of sensors 270 can be used such as, but not limited to, depth sensors, radars, and LIDAR mounted on the trailing vehicle. Vehicle-to-vehicle communications 260 can be performed by using light or radio waves between vehicles. These communications 260 can allow vehicles to exchange on a one-to-one basis information. The vehicle-to-vehicle communications 260 as described herein are not limited to any particular configuration.

The communications 260, as will be shown below, can be used to provide information related to a vehicle's surroundings including whether there are vehicles in front of them and whether they are braking, speeding, or performing other actions. In one embodiment, the communications 260 can be used to create a vehicular ad hoc network. Ad hoc networks can be formed by cars and such networks can help overcome blind spots, avoid accidents, etc.

FIG. 3 illustrates an exemplary vehicle-to-vehicle communication 260 to provide the look ahead for a trailing vehicle 302 in accordance with one aspect of the present disclosure. While traveling behind the preceding vehicle 120 of the system 300, at least a portion of the area ahead of, and possibly one or both sides of the leading vehicle 306, can be obstructed from the view of the driver of the trailing vehicle 302 especially when the preceding vehicle 120 is larger than the leading vehicle 306. The system 300 can overcome these challenges through the head-up display 106 and/or vehicle-to-vehicle communications 260.

The preceding vehicle 120, or vehicle in front of the trailing vehicle 302, can be configured to obtain data regarding the presence or absence of an object, stationary or moving, in the area in front of the preceding vehicle 120. The vehicle 120 can have a short range detection sensor for determining a distance 314 between the preceding vehicle 120 and the leading vehicle 306. The vehicle 120 can include, but is not limited to, a camera, depth sensor, radar, and LIDAR to determine the distance 314 between the vehicle 120 and the leading vehicle 306. The distance 314 can be used by the trailing vehicle 302 to determine information about the leading vehicle 306 obscured by the preceding vehicle 120.

In one embodiment, and which will be described in further details below, the preceding vehicle 120 can determine whether a leading vehicle 306 is braking or slowing down. The vehicle 120 in front of the trailing vehicle 302 can determine whether the car is slowing by determining a change in distance 314 between the two or through other direct determinations. When the distance 314 is shortened, typically the leading vehicle 306 is pressing their brakes or coasting. Alternatively, the leading vehicle 306 can include vehicle-to-vehicle communications 260 to the preceding vehicle 120 for providing this information.

When information regarding the leading vehicle 306 is obtained by the preceding vehicle 120, this data can be provided to the trailing vehicle 302 through vehicle-to-vehicle communications 260 by opening a communication channel. This can include wireless modules 310 and 312 provided on the trailing vehicle 302 and the preceding vehicle 120, respectively. These modules 310 and 312 can be a part of, but are not limited to, a dedicated short range communication wireless network. The preceding vehicle 120 or leading vehicle 306 can distribute vehicle-to-vehicle communications 260 to neighboring vehicles over the dedicated short range communication wireless network. In one embodiment, alternatively, the trailing vehicle 310 can request data from the leading vehicle 306 through vehicle-to-vehicle communications 260.

After receiving the data, the trailing vehicle 302 can process the data and display information representative of this processed data onto the head-up display 106. FIG. 4 illustrates an exemplary point of view 400 showing the augmented reality indicator 122 over a preceding vehicle 120 in accordance with one aspect of the present disclosure. The head-up display 106 can provide a simple icon 404 that indicates the status of the leading vehicle 306. In one embodiment, which will be shown below, the icon 404 can provide whether the braking system has been activated or deactivated or whether the leading vehicle 306 is slowing down.

As shown, spatiotemporal information of a leading vehicle 306 by the preceding vehicle 120 through vehicle-to-vehicle communications 260 is provided. The spatiotemporal information can include in addition to vehicles, pedestrians and/or other objects. The information can be processed and displayed on a head-up display 106 of the trailing vehicle 302 so that the driver of the trailing vehicle 302 can view a virtual representation of the area ahead of the preceding vehicle 120 that has been obstructed.

The augmented reality indicator 122 on the head-up display 106 can be configured to project a trapezoidal road icon onto the windshield 112 so that the driver can see the road icon above the preceding vehicle 120. The trapezoidal shape of the augmented reality indicator 122 can simulate a three-dimensional perspective of the road ahead of the preceding vehicle 120. As shown, the head-up display 106 can project a vehicle icon 404 onto the trapezoidal road indicator 122. Based on the distance 314 measured between the preceding vehicle 120 and the leading vehicle 306, the position of the icon 404 can vary. The size of the vehicle icon 404 on the augmented reality indicator 122 can also vary to graphically simulate the spacing and the rate of change of the distance 314 between the preceding vehicle 120 and the leading vehicle 306 removing the obstructed view of the leading vehicle 306. Animations can be provided of the icon 404 showing changes in distances 314.

FIG. 5 illustrates the augmented reality indicator 122 with an obstructed view of the leading vehicle 120 in accordance with one aspect of the present disclosure. The augmented reality indicator 122 can be shown above the preceding vehicle 120. The leading vehicle 306 is wholly hidden where it can no longer be seen. In one embodiment, the indicator 122 is transparent, or semi-transparent, such that objects can still be seen, for example, bridges and trees. The leading vehicle icon 404 can be presented to indicate the distance 314 between the preceding vehicle 120 and the leading vehicle 306. The color scheme and transparency of the augmented reality indicator 122 can be adjusted based on the environment of the device 200. For example, the icon 404 can be highlighted when the surrounding environment of the trailing vehicle 302 is dark.

FIG. 6 illustrates the augmented reality indicator 122 with the leading vehicle 306 braking in accordance with one aspect of the present disclosure. The augmented reality indicator 122, as provided, can show that the distance 314 between the leading vehicle 306 and the preceding vehicle 120 has shortened. The leading vehicle icon 404 in the augmented reality indicator 122 has moved down and grown larger.

In one embodiment, and as discussed earlier, the leading vehicle icon 404 can incorporate brake lights 602 for the leading vehicle 306 when brakes are applied by the leading vehicle 306. Alternatively, the icon 404, or a portion of the icon 404, can be lit up when the preceding vehicle 120 detects that the leading vehicle 306 is braking or slowing. This information can be detected from the leading vehicle 306 and provided through the vehicle-to-vehicle communications 260 to the trailing vehicle 302 where it can be displayed on the head-up display 106 of the trailing vehicle 302.

When a preceding vehicle 120 changes, for example the vehicle 120 moves lanes or another vehicle comes between, the trailing vehicle 302 can detect a new vehicle 120 in front of them. The new preceding vehicle 120 can then be processed and communicated with through the vehicle-to-vehicle communications 260 by the trailing vehicle 302. In one embodiment, a period of time can elapse before the new preceding vehicle 120 is detected and the augmented reality indicator 122 is displayed which can correspond with the time the device 200 takes to detect the preceding vehicle 120.

In one embodiment, a number of vehicles can be shown. Instead of a single icon 404 on the augmented reality indicator 122, a number of icons representing leading vehicles can be provided. A large amount of icons can represent a traffic accident or jam. While the augmented reality indicator 122 was shown to have only a single icon 404, vehicle-to-vehicle communications 260 can connect a number of vehicles together and be represented on the head-up display 106 of the trailing vehicle 302. For example, vehicles in front of and to the left and/or right of the preceding vehicle 120 can be indicated on the display 106 if there are vehicles in front of them.

While typically displayed, the augmented reality indicator 122 can be removed in some instances. For example, the augmented reality indicator 122 can be distracting and be removed if the trailing vehicle 302 is too close to the preceding vehicle 120. This can remove distractions such that focus can be made on the vehicle 120 in front. When no preceding vehicle 120 is in front, the augmented reality indicator 122 can be removed.

In one embodiment, icons on the head-up display 106 of the trailing vehicle 302 within the augmented reality indicator 122 can indicate distances. A first distance between the preceding vehicle 120 and the trailing vehicle 302 can be shown through an indicator as well as a distance 314 between the leading vehicle 306 and the preceding vehicle 120. For example, the distance between the preceding vehicle 120 and the trailing vehicle 302 can be twenty feet while the distance 314 between the leading vehicle 306 and the preceding vehicle 120 can be ten feet and each of these can be displayed through icons on the indicator 122. In one alternative embodiment, the distance 314 only between the leading vehicle 306 and the preceding vehicle 120 can be indicated.

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein can be implemented as logical operations and/or modules. The logical operations can be implemented as a sequence of processor-implemented executed steps and as interconnected machine or circuit modules. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for representing an area in front of a vehicle on a trailing vehicle comprising:
   connecting with the vehicle through vehicle-to-vehicle communications;
   displaying an augmented reality indicator representing the area in front of the vehicle, wherein the augmented reality indicator is presented above the vehicle on the trailing vehicle and simulates a three-dimensional perspective of a road ahead of the preceding vehicle; and
   displaying spatiotemporal information within the augmented reality indicator of a leading vehicle identified by the vehicle and communicated to the trailing vehicle through the vehicle-to-vehicle communications.

2. The method of claim 1, wherein connecting with the vehicle through the vehicle-to-vehicle communications comprises detecting the vehicle in front of the trailing vehicle.

3. The method of claim 1, wherein connecting with the vehicle through the vehicle-to-vehicle communications comprises opening the vehicle-to-vehicle communications with the vehicle in front of the trailing vehicle.

4. The method of claim 3, wherein connecting with the vehicle through the vehicle-to-vehicle communications comprises detecting the vehicle in front of the trailing vehicle through a camera.

5. The method of claim 1, wherein displaying the augmented reality indicator representing the area in front of the vehicle comprises showing an area unobstructed by the vehicle.

6. The method of claim 1, wherein displaying the spatiotemporal information within the augmented reality indicator of the leading vehicle identified by the vehicle and communicated to the trailing vehicle through the vehicle-to-vehicle communications comprises showing an indicator representing a distance between the preceding vehicle and the leading vehicle.

7. A look ahead system comprising:
   a head-up display;
   at least one processor; and
   a memory operatively coupled to the processor, the memory storing program instructions that when executed by the processor, causes the processor to:
   identify a vehicle;
   receive information regarding a leading vehicle from the vehicle;
   display an augmented reality indicator on the head-up display above the vehicle showing an area in front of the vehicle and an icon for the leading vehicle.

8. The look ahead system of claim 7, wherein the head-up display shows volumetric images.

9. The look ahead system of claim 7, wherein the augmented reality indicator is trapezoidal displaying information unobstructed by the vehicle.

10. The look ahead system of claim 7, wherein the information regarding the leading vehicle is positioned within the augmented reality indicator and changes positions dependent on a distance between the vehicle and the leading vehicle.

11. The look ahead system of claim 7, wherein the memory storing program instructions, when executed by the processor, causes the processor to display brake lights on the icon for the leading vehicle when brakes are applied by the leading vehicle.

12. The look ahead system of claim 7, wherein the memory storing program instructions, when executed by the processor, causes the processor to display a plurality of icons representing multiple vehicles.

13. The look ahead system of claim 7, wherein the augmented reality indicator on the head-up display is transparent.

14. A vehicle comprising:
   a wireless communication module receiving information regarding an area in front of a preceding vehicle; and
   a head-up display depicting an augmented reality indicator above the preceding vehicle and showing the information regarding the area in front of the preceding vehicle.

15. The vehicle of claim 14, wherein the information regarding the area in front of the preceding vehicle shows distances between the preceding vehicle and a leading vehicle.

16. The vehicle of claim 14, wherein the augmented reality indicator is transparent.

17. The vehicle of claim 14, wherein the augmented reality indicator is trapezoidal.

18. The vehicle of claim 14, wherein the augmented reality indicator shows a view unobstructed by the preceding vehicle.

19. The vehicle of claim 14, wherein the augmented reality indicators shows a plurality of vehicle icons.

20. The vehicle of claim 17, wherein the trapezoidal augmented reality indicator simulates a three-dimensional perspective of a road ahead of the preceding vehicle.

* * * * *